United States Patent
Parker et al.

[15] 3,686,705
[45] Aug. 29, 1972

[54] SQUEEGEE WIPER FOR TAILGATE WINDOWS

[72] Inventors: Eric G. Parker, Kettering; Charles C. Wolf, Dayton, both of Ohio

[73] Assignee: General Motors Corporation, Detroit, Mich.

[22] Filed: April 19, 1971

[21] Appl. No.: 135,250

[52] U.S. Cl................................15/250.01, 15/250.1
[51] Int. Cl...............................B60s 1/46, A471 1/02
[58] Field of Search..........................15/250.01, 250.1

[56] References Cited

UNITED STATES PATENTS

| | | | |
|---|---|---|---|
| 2,743,472 | 5/1956 | Alef | 15/250.1 |
| 3,452,384 | 7/1969 | Scinta | 15/250.1 |
| 3,548,441 | 12/1970 | Kruger | 15/250.1 X |
| 3,579,698 | 5/1971 | Verdoodt et al. | 15/250.1 |

*Primary Examiner*—Peter Feldman
*Attorney*—W. E. Finken and W. A. Shuetz

[57] ABSTRACT

In a preferred form, this disclosure relates to a tailgate window cleaning system for cleaning a tailgate window of a station wagon vehicle. The tailgate window cleaning system comprises an elongated stationary support means which is adapted to be secured to the tailgate adjacent its upper end, an elongated window wiper for wiping the window and which is supported by the support means for movement in opposite directions between an on-glass position in which the blade engages the window and an off-glass position in which the blade is disengaged from the window, biasing means for biasing the wiper towards its on-glass position, and a positioning mechanism for holding the wiper in its off-glass position as the window is moved from its fully closed position toward its fully open position and which releases the wiper blade for movement towards its on-glass position as it approaches its fully open position and maintains the same in this position as the window is moved from its fully open position toward its fully closed position. The window cleaner system also includes a washer means which comprises a plurality of spray openings in the wiper for emitting washer fluid against the window when the window is moved from its fully open position toward its fully closed position.

3 Claims, 6 Drawing Figures

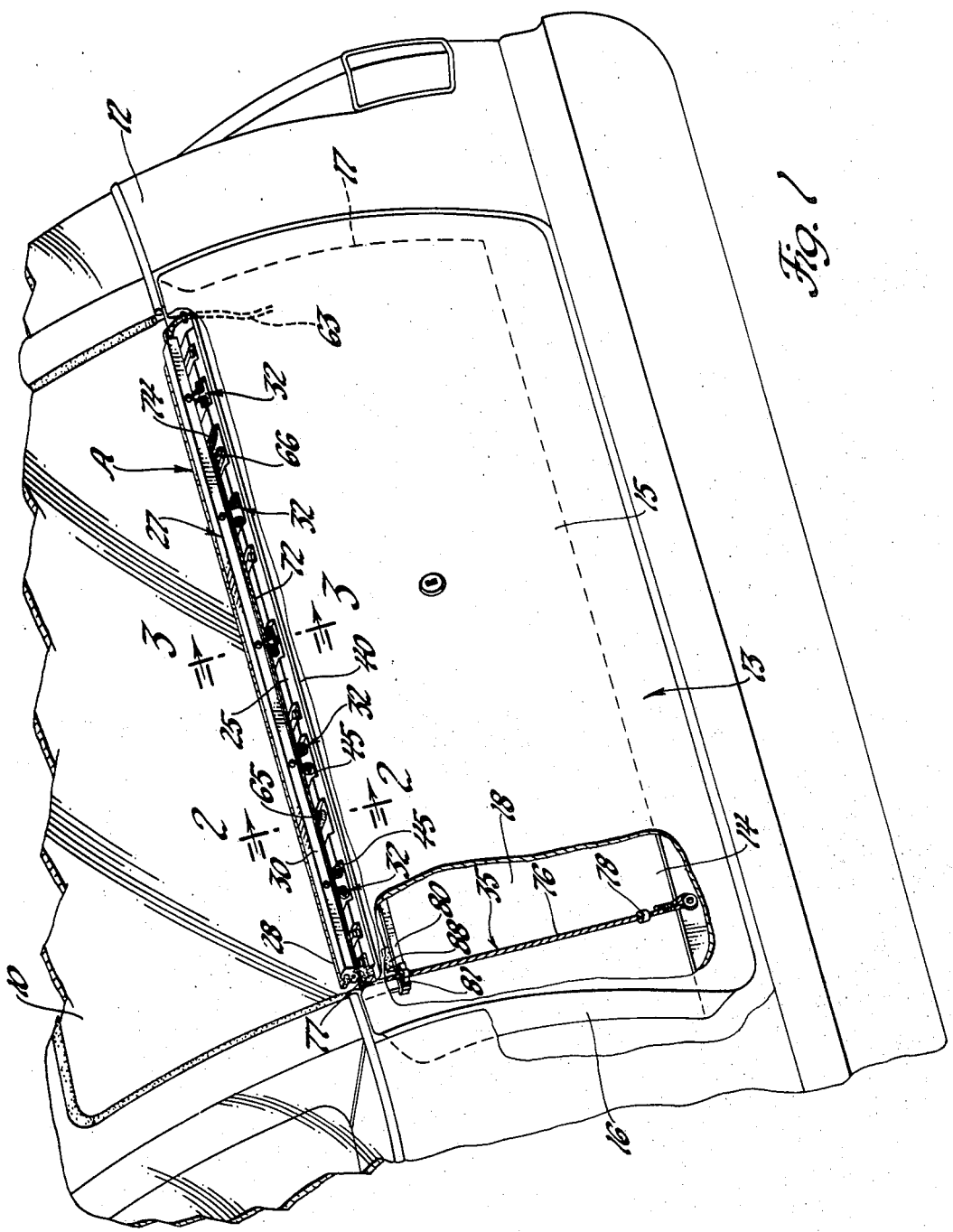

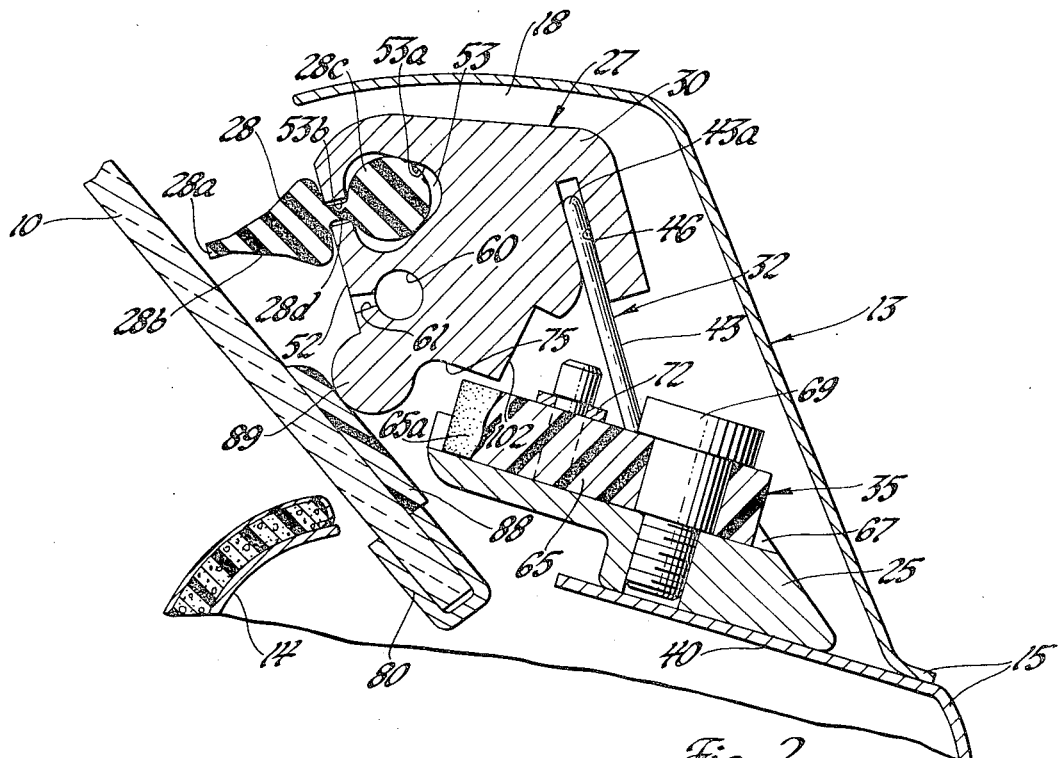

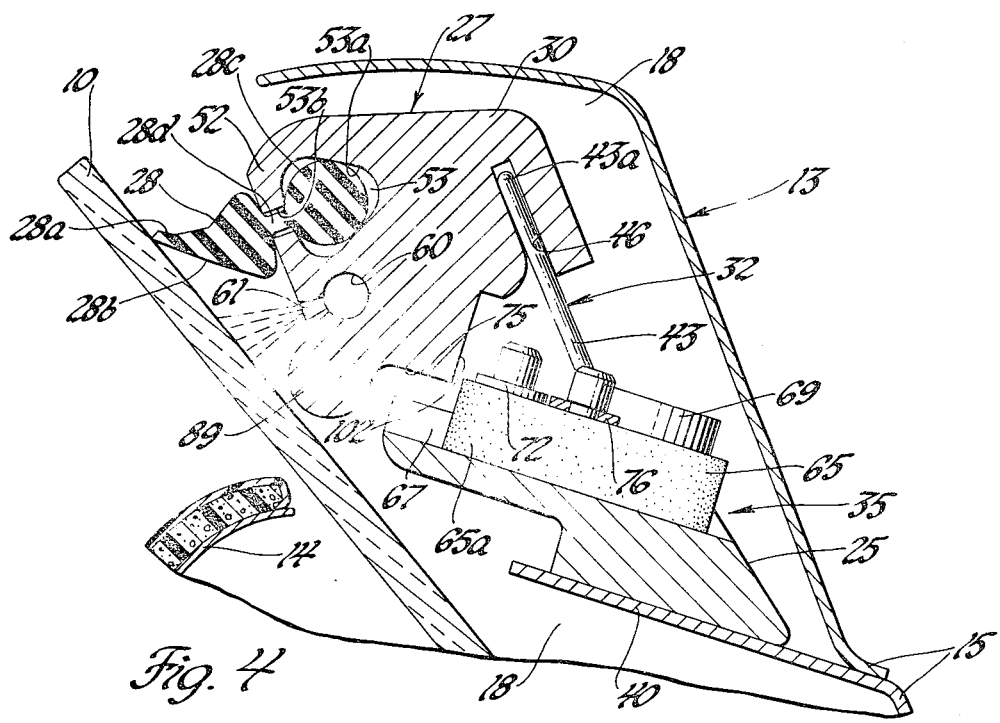
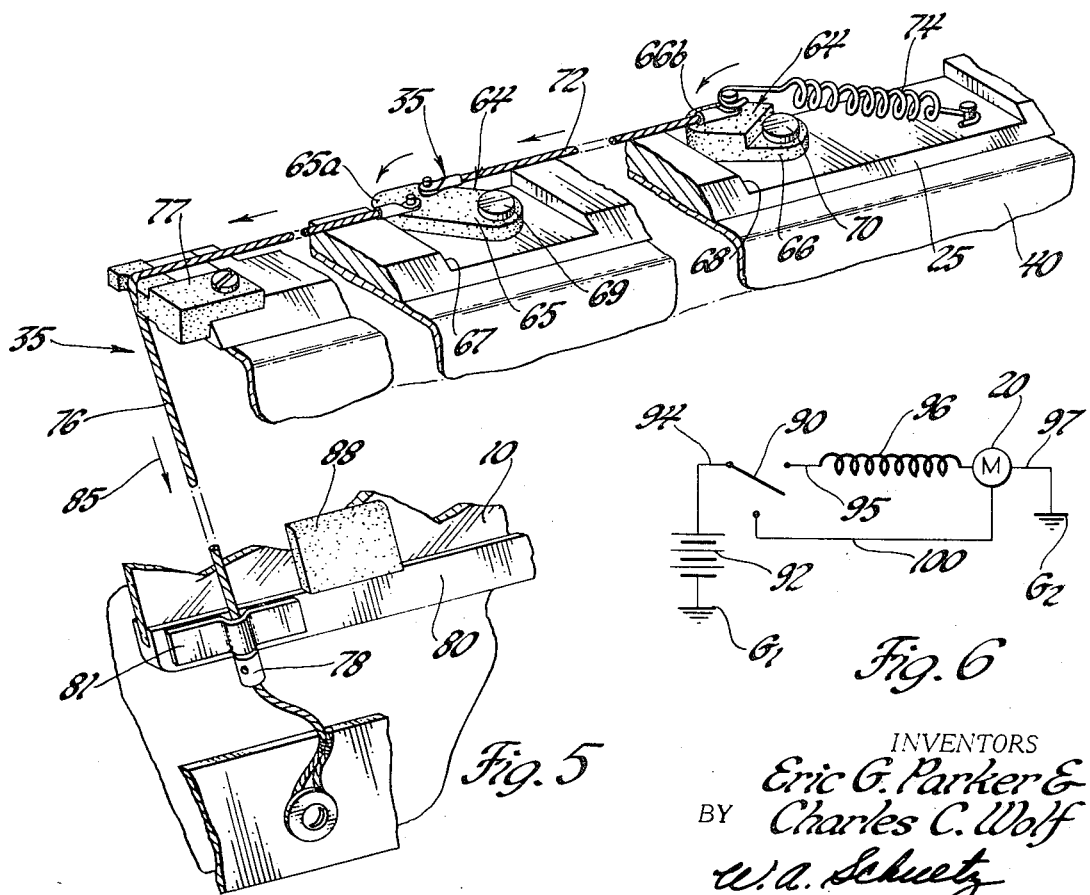

SQUEEGEE WIPER FOR TAILGATE WINDOWS

The present invention broadly relates to a window cleaning system, and in particular to the window cleaning system for cleaning a rear window of a station wagon vehicle and in which the window cleaner system is rendered inoperative as the window is being moved from its closed position towards its open position and operative to clean the window when the latter is moved from its open position towards its closed position.

Heretofore, window cleaner systems for cleaning a movable window of an automotive vehicle have been provided. These known systems have included various arrangements or mechanisms for effecting movement of a wiper or squeegee to an on-glass position to wipe the window as the latter is being raised and to an off-glass position as the latter is being lowered. Examples of such window cleaner systems are shown in U.S. Pat. Nos. 2,743,472 and 3,452,384. These known systems have also included a spray bar for emitting washer fluid against the window as the latter is being raised.

The present invention is directed to a new and improved arrangement for effecting movement of a wiper or squeegee to an on-glass position as the window is being raised and to an off-glass position when the window is being lowered. In the preferred embodiment, the novel window cleaner system is used for cleaning a rear window of a station wagon vehicle. It includes an elongated stationary support means which is secured to the vehicle and extends laterally of the window adjacent the upper edge of the tailgate, a window wiper including a flexible wiper blade for wiping the window and an elongated blade holder for supporting the wiper blade, spring means for pivotally supporting the wiper for movement in opposite directions between an on-glass position in which the blade engages the window and an off-glass position in which the blade is disengaged from the window and with the spring means biasing the wiper towards its on-glass position, and a positioning mechanism for holding the wiper in its off-glass position as the window is moved from its fully closed position towards its fully open position, releasing the wiper for movement towards its on-glass position by the spring means as the window approached its fully open position, allowing the wiper to remain in its on-glass position as the window is raised from its fully open position towards its closed position and moving the wiper from its on-glass position towards its off-glass position in opposition to the biasing force of the spring means as the window approaches its fully closed position.

The positioning mechanism includes a first cam means pivotally supported by support means and which is biased toward a first position in which it engages an underside portion of the blade holder to hold the wiper in its off-glass position; a member carried by the window and cooperably engageable with a fitting operatively connected with the first cam means for moving the first cam means from its first position toward a second position in which it releases the wiper for movement towards its on-glass position in response to the window approaching its fully open position; and a second cam means carried by the window and engageable with the wiper to move the same from its on-glass position toward its off-glass position when the window approaches its fully closed position.

An important object of the present invention is to provide a new and improved window cleaning system or apparatus for cleaning a window which is supported by an automotive vehicle for movement in opposite directions between closed and open positions, and which is of an economical and simple construction and constructed and arranged such that an elongated wiper or squeegee is moved to an off-glass position as the window is being lowered and is moved to an on-glass position for wiping the same when the window is being raised.

Another object of the present invention is to provide a new and improved window cleaning apparatus for cleaning a movable window of an automotive vehicle, preferably a rear window of the station wagon vehicle, and which includes an elongated stationary support means which is adapted to be secured to the vehicle and extend laterally of the window, an elongated wiper comprising a flexible wiper blade for wiping the window and an elongated blade holder for supporting the wiper blade which in turn is supported by the support means for movement in opposite directions, biasing means, preferably a spring means, for supporting the wiper for movement in opposite directions between an on-glass position and an off-glass position and which biases the wiper toward an on-glass position, a first cam means pivotally supported by the support means and biased toward a first position which engages an underside portion of the blade holder to hold the wiper in its off-glass position, a member carried by the window and cooperably engageable with means connected with the first cam means for moving the first cam means from its first position toward a second position in which it releases the wiper for movement toward its on-glass position in response to the window approaching its fully open position and a second cam means carried by the window and engageable with the blade holder to move the wiper from its on-glass position toward its off-glass position when the window approaches its fully closed position.

Yet another object of the present invention is to provide a new and improved window cleaning apparatus, as defined in the next preceding object, and in which the means connected to the first cam means for moving the same from its first position toward the second position comprises a cable whose movement is guided by one end of the stationary support means and which has one end thereof connected to the tailgate and a fitting carried by the cable which is engageable by the member carried by the window as the window approaches its fully open position to cause the cable to be yanked and the first cam means to be moved towards its second position to release the wiper for movement toward its on-glass position.

A further object of the present invention is to provide a new and improved window cleaning apparatus, as defined in any of the preceding objects, and in which the blade holder has an elongated opening therethrough in communication with a plurality of apertures for emitting washer fluid underpressure against the glass to wet the same in response to the window being moved from its open position towards its closed position.

The present invention further resides in various novel constructions and arrangement of parts, and further objects novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which:

FIG. 1 is a fragmentary rear perspective view of a station wagon vehicle embodying the novel window cleaner apparatus of the present invention;

FIG. 2 is an enlarged fragmentary sectional view taken approximately along line 2—2 of FIG. 1;

FIG. 3 is an enlarged fragmentary sectional view taken approximately along lines 3—3 of FIG. 1;

FIG. 4 is an enlarged fragmentary sectional view like that shown in FIG. 2 but showing different parts thereof in different positions;

FIG. 5 is an enlarged fragmentary perspective view of part of the windshield cleaner shown in FIG. 1; and FIG. 6 is a schematic wiring diagram for controlling operation of the window cleaner apparatus.

As representing a preferred embodiment of the present invention, the drawings show a window cleaning apparatus or system A for cleaning a window 10 of a station wagon vehicle 12. The station wagon vehicle 12 includes a tailgate 13 having inner, outer and side walls 14–17, respectively. The walls 14–17 define a compartment or well 18 in which the window cleaning apparatus A is housed.

The tailgate 13 guidably supports the window 10 for movement in opposite directions between a fully closed position, as shown in FIG. 1, and a fully open position, as shown in FIG. 4. The window 10 is adapted to be moved between its open and closed positions by a suitable or conventional window regulator mechanism (not shown) which includes a reversible, DC electric motor 20 (schematically shown in FIG. 6) for operating the window regulator mechanism. The rear window 10 is received within the well 18 of the tailgate 13 as the latter is lowered to its fully open position.

The rear window cleaner apparatus A broadly comprises a support means 25 carried by the tailgate adjacent its upper end, an elongated windshield wiper 27 extending laterally across the window which includes a flexible wiper blade 28 and a blade holder 30, a biasing means 32 for supporting the window wiper 27 for pivotal movement between a first or on-glass position, as shown in FIG. 4, and a second or off-glass position, as shown in FIG. 3, and which biases the window wiper 27 towards its on-glass position, and a positioning mechanism or arrangement 35 which is operable to (1) hold the window wiper 27 in its off-glass position as the window 10 is lowered from its fully closed position towards its fully open position, (2) release the window wiper 27 for movement towards its on-glass position by the biasing means 32 as the window approaches its fully open position, (3) allow the window wiper 27 to remain in its on glass position as the window is raised from its fully open position towards its fully closed position and (4) move the window wiper 27 from its on-glass position to its off-glass position in opposition to the biasing force of the biasing means 32 as the window 10 approaches its fully closed position.

The support means 25 for supporting the window wiper 27 comprises an elongated plastic member which is suitably secured to a support panel 40 carried by the outer panel 15 adjacent the upper end of the tailgate 13. The panel 40 is slanted with respect to a horizontal plane and extends laterally across the tailgate 13.

The wiper 27 is pivotally supported by the biasing means 32. The biasing means 32 comprises a plurality of torsion springs 43 spaced longitudinally along the support means 25. The torsion springs 43 are located in recesses 45 in the upper portion of a support means 25 and have one end rigidly secured to the support means and the other end secured to the blade holder 30. As shown in FIG. 3, the torsion springs 43 each have their ends 43a and 43b in the form of a loop which is received within rectangularly shaped slots 46 and 47 in the blade holder 30 and support means 25. The torsion springs 43 are secured to the blade holder 30 and support means 25 by pins 48 and 49 which are received within openings 50 and 51 extending transversely of the slots 46 and 47, respectively.

The blade holder 30 comprises an elongated one-piece plastic member having the configuration shown in the drawing and which extends laterally across the rear window 10. The blade holder 30 adjacent its forward end 52 has an opening 53 extending longitudinally thereof for receiving the wiper blade 28. The opening 53 includes a triangularly shaped portion 53a spaced from the forward end 52 of the blade holder 30 and a neck or slot portion 53b of reduced transverse dimension for communicating the forward end 52 with the opening portion 53a.

The wiper blade 28 is made from a suitable resilient or flexible material, preferably rubber, and has a wiping portion 28a which is adapted to engage the outer surface of the rear window 10, a generally triangularly shaped body portion 28b intermediate its ends which is adapted to engage the forward end 52 of the wiper blade holder 30, a retention portion 28c which is received within the opening portion 53a and a neck portion 28d which is received within the slot portion 53b of the blade holder 30. The retention portion 28c securely retains the wiper blade 28 within the blade holder 30 and the neck portion 28d allows the wiping portion to be readily flexed in opposite directions about the retention portion 28c.

The wiper blade holder 30 also serves as a spray bar of a washer unit for emitting washer fluid against the outer surface of the windshield at spaced lateral locations therealong. To this end, the blade holder has a longitudinally extending opening 60 therethrough and a plurality of longitudinally spaced apertures 61 extending from the forward end 52 to the opening 60. The opening 60 is plugged at one end (not shown) and its other end is adapted to be connected to an outlet of a washer pump (not shown) via a flexible conduit 63.

The washer pump and unit for supplying washer fluid from a reservoir (not shown) to the wiper blade holder 30 could be of any suitable or conventional construction and is adapted to be energized only when the wiper is moved to its on-glass position as the window 10 is being raised. The washer unit is preferably like that disclosed in copending application, Ser. No. 91,813, filed Nov. 23, 1970, in the name of Lloyd K. Kuck, which is assigned to the same assignee as the present invention.

The positioning mechanism 35 for effecting movement of the wiper 27 between its on-glass and off-glass positions comprises a first cam means 64 including a pair of spaced cams 65 and 66 which are respectively located within recesses 67 and 68 in the upper portions of the support means 25 and which are pivotally connected adjacent their rearward ends to the support means 25 by pivot pins 69 and 70. The cams 65 and 66 are interconnected with each other by a cable 72 and are spring biased by a tension spring 74 toward a first position in which their forward portions 65a and 66b are disposed beneath an underside portion 75 of the blade holder 30, as shown in FIG. 2. The tension spring 74 has one end connected to the cam 66 and its other end connected to the stationary support 25. The cam 65 is also connected to the tailgate via a cable 76. The cable 76 has one end connected to the cam 65 and its other end connected to the tailgate 13. The cable intermediate its ends is guided by a grooved guide means 77 carried by the support means 25 at its left end, as shown in FIG. 5. The cable 76 intermediate its end has a fitting 78 secured thereto.

The cams 65 and 66 are adapted to be pivoted from their first position in which they hold the blade holder 30 in its off-glass position toward a second position, as shown in FIGS. 4 and 5, in which they are disengaged from the underside portion 75 of the blade holder 30 in response to the window 10 approaching its fully open position. To this end, the window at its lower end is received within a channel 80, the channel 80 in turn carrying a member 81 secured thereto and through which the cable 76 can slidably pass. As the window 10 is lowered the member 81 slides over the cable 76. As the window 10 approaches its fully open position, the member 81 will engage the fitting 78 on the cable 76 and move or yank the cable in a downward direction, as indicated by the arrow 85, to cause the cams 65 and 66 to be pivoted from their first position toward their second position in which they allow the biasing means 32 to move the wiper 27 to its on-glass position.

The wiper 27 is adapted to be moved from its on-glass position to its off-glass position by a second cam means comprising a pair of cams 88 carried at the opposite sides of the window 10 adjacent its lower end when the window approaches its fully closed position. As the window approaches its fully closed position, the cams 88 will engage a rounded cam portion 89 integral with the blade holder 30 at the juncture of its forward and lower ends or sides. As the cams 88 engage the cam portions 89 they cause the blade holder 30 to be pivoted in a clockwise direction in opposition to the biasing force of the biasing means 32. The cams 88 having tapered or rounded upper edge portions so as to gradually move the wiper 27 towards its off-glass position. When the wiper 27 has been moved to the position shown in FIGS. 2 and 3, the tension spring 74 will pivot the cams 65 and 66 in a clockwise direction and beneath the underside 75 of the blade holder 30.

As alluded to hereinbefore, a window regulator mechanism (not shown) for raising and lowering the window 10 is operated by a reversible electric motor 20 which is controlled by a suitable manually operable switch 90 mounted on the dashboard (not shown) of the vehicle. Referring to FIG. 6, a schematic electrical control means is thereshown for controlling operation of the reversible motor 20. The control means includes a battery 92 having one side connected to ground $G_1$, its other side connected to the manual switch 90 via wire or conductor 94. The switch is preferably a three-position switch having a neutral center position, a first ON position in which it energizes the motor 20 for rotation in a first direction and a second ON position in which it energizes the motor 20 for rotation in the opposite direction. The switch 90 would be moved upwardly to its first ON position when the window is to be raised. When the switch is moved to its first ON position, a circuit is completed from the battery 92, wire 94, switch 90, wire 95, a relay 96 for the washer unit (not shown), the motor 20, wire 97 to ground $G_2$. This energizes the motor 20 for rotation in a first direction to cause the window regulator mechanism to move the window from its open position towards its fully closed position and simultaneously energizes the washer unit to deliver pressurized washer fluid to the blade holder 30. When the switch 90 is moved to its second on position, a circuit is completed to energize the motor 20 for rotation in the opposite direction to cause the window regulator mechanism to move the window from its closed position toward its open position. This circuit is from battery 92, wire 94, switch 90, wire 100, motor 20, wire 97 to ground $G_2$. When the window 10 is being lowered or opened, the washer unit relay 96 is not energized and hence, no washer fluid is sprayed against the window 10.

A complete cycle of operation of the window cleaner apparatus of the present invention will be described starting with the window 10 in its fully closed position, as shown in FIG. 1. In the fully closed position the cams 88 engage the cam portions 89 on the blade holder 30 to hold the wiper 27 in its off-glass position and the cams 65 and 66 are disposed beneath the underside 75 of the blade holder 30. When the operator moves the manual switch (see FIG. 6) to its lower position, the motor 20 is energized for rotation in a direction to cause window regulator mechanism (not shown) to move the window 10 from its fully closed position, as shown in FIG. 1, towards its fully open position, as shown in FIG. 4. As the window 10 is lowered, the cams 88 disengage the cam portions 89 on the blade holder 30. The blade holder 30 remains, however, in its off-glass position, since the wiper 27 is prevented from engaging the window 10 by the cams 65 and 66 which are now in engagement with the underside of the blade holder 30. The wiper 27 remains in its off-glass position until the rear window 10 approaches its fully open position.

As the window approaches its fully open position the member 81 carried at the lower end of the window 10 engages the fitting 78 secured to the cable 76 and causes the cable 76 to move downwardly in the direction of the arrow 85. Movement of the cable 76 in this direction causes the cams 65 and 66 to be pivoted from their first position in which they engage the underside of the blade holder 30 to its second position in which they are disengaged therefrom. When the cams 65 and 66 are moved from engagement with the blade holder 30, the biasing means 32 will pivot the wiper 27 toward the window 10 and the wiper blade 28 into engagement with the rear window 10. Thus, when the rear window 10 is in its fully open position, the wiper 27 is in its on-glass position.

When the operator desires to raise the window 10 from its fully open position towards its closed position, he will move the manual control switch 90 to its upper position to energize the motor 20 for rotation in a direction to cause the window regulator mechanism to raise the window. Simultaneously therewith the relay coil 96 of the washer unit is energized to cause pressurized washer fluid to be supplied to the blade holder 30 and emitted in jet form against the outer surface of the window 10. As the window 10 is raised, washer fluid will be sprayed beneath the wiper blade 28 and the wiper blade 10 will engage the window 10 to wipe the same as the window moves upwardly relative to the wiper blade 28. When the wiper 27 is in its on-glass position, the cams 65 and 66 are prevented from engaging the underside 74 of the blade holder 30 as a result of their engagement with the side portions 102 of the blade holder 30.

As the window approaches its fully closed position, the cams 88 will engage the cam portions 90 on the blade holder 30 and cause the blade holder 30 to be pivoted in a clockwise direction in opposition to the biasing force of the biasing means 32. When the wiper 27 has been moved to its off-glass position by the cams 88 the side portions 102 are disengaged from the cams 65 and 66 and hence, the tension spring 74 will pivot the cams 65 and 66 in a clockwise direction toward their first position in which they are disposed beneath the undersurface 74 of the blade holder 30.

From the foregoing, it should be apparent that a novel window cleaner system for cleaning a rear window of a tailgate for a station wagon vehicle has been provided. It should also be apparent that the positioning mechanism or arrangement for moving the wiper between its on-glass and off-glass position is of a relatively simple and economical construction.

Although the illustrated embodiment thereof has been described in great detail, it should be apparent that certain modifications, changes and adaptations may be made in the illustrated embodiment, and that it is intended to cover all such modifications, changes and adaptations which come within the spirit of the present invention.

What is claimed is:

1. A window cleaning apparatus for cleaning a window which is supported by an automotive vehicle for movement in opposite directions between closed and opened positions comprising: an elongated stationary support means which is adapted to be secured to the vehicle and extend laterally of the window; an elongated flexible wiper blade for wiping the window, an elongated blade holder for supporting the wiper blade and which in turn is supported by the support means for movement in opposite directions between a first position in which said blade engages the window and a second position in which said blade is disengaged from said window; biasing means for biasing said blade holder towards its first position; a releasable cam means pivotally supported by said support means and biased toward a first position in which it engages an underside portion of said blade holder to hold it in its second position a first means carried by said window and cooperably engageable with a second means connected with said first cam means for moving said first cam means from its first position towards a second position in which it releases said blade holder for movement towards its first position in response to said window approaching its fully open position, said blade holder when in its first position preventing return of said first cam means towards its first position, and second cam means carried by said window and engageable with said blade holder to move said blade holder from its first position towards its second position as said window approaches its fully closed position, said first cam means returning towards its first position in which it is disposed beneath the underside of the blade holder means when the latter has been moved by said second cam means to its second position.

2. A window cleaning apparatus for cleaning a rear window which is supported by the tailgate of a station wagon vehicle for movement in opposite directions between closed and opened positions comprising: an elongated stationary support means which is adapted to be secured to the tailgate and which extends laterally of the window adjacent the upper edge of the tailgate; an elongated flexible wiper blade for wiping the rear window; an elongated blade holder for supporting the wiper blade; spring means operatively connected with said support means and said blade holder for supporting said blade holder for pivotal movement in opposite directions between a first position in which said blade engages the rear window and a second position in which said blade is disengaged from said rear window, said spring means biasing said blade holder towards its first position; and a mechanism for holding said blade holder in its second position as said window is moved from its fully closed position towards its fully open position, releasing said blade holder for movement towards its first position by said spring means as the window approaches its fully open position, allowing said blade holder to remain in its first position as the window is raised from its fully open position towards its fully closed position and moving said blade holder from its first position to its second position in opposition to the spring means as the window approaches its fully closed position, said mechanism including a first cam means pivotally supported by said support means for movement between a first position in which it engages an underside portion of said blade holder to hold it in its second position and a second position in which it allows said blade holder to move towards its first position, second spring means for biasing said first cam means towards its first position, a cable having one end connected with said cam means and its other end adapted to be connected with the tailgate, a fitting carried by said cable adjacent its other end, and means carried by said window and cooperably engageable with said fitting for moving said cable to move said first cam from its first position towards its second position as the window approaches its fully open position, and second cam means carried by said window and engageable with said blade holder to move the latter from its first position towards its second position when said window approaches its fully closed position, said second spring means turning said first cam means towards its first position when said blade holder has been moved to its second position by said second cam means.

3. A window cleaning apparatus for cleaning a rear window which is supported by the tailgate of a station wagon vehicle for movement in opposite directions between closed and opened positions comprising: an elongated stationary support means which is adapted to be secured to the tailgate and which extends laterally of the window adjacent the upper edge of the tailgate; an elongated flexible wiper blade for wiping the rear window; an elongated blade holder for supporting the wiper blade; spring means operatively connected with said support means and said blade holder for supporting said blade holder for pivotal movement in opposite directions between a first position in which said blade engages the rear window and a second position in which said blade is disengaged from said rear window, said spring means biasing said blade holder towards its first position; and a mechanism for holding said blade holder in its second position as said window is moved from its fully closed position towards its fully open position, releasing said blade holder for movement towards its first position by said spring means as the window approaches its fully open position, allowing said blade holder to remain in its first position as the window is raised from its fully open position towards its fully closed position and moving said blade holder from its first position to its second position in opposition to the spring means as the window approaches its fully closed position, said mechanism including a first cam means pivotally supported by said support means for movement between a first position in which it engages an underside portion of said blade holder to hold it in its second position and a second position in which it allows said blade holder to move towards its first position, second spring means for biasing said first cam means towards its first position, a cable having one end connected with said cam means and its other end adapted to be connected with the tailgate, a fitting carried by said cable adjacent its other end, and means carried by said window and cooperably engageable with said fitting for moving said cable to move said first cam from its first position towards its second position as the window approaches its fully open position, and second cam means carried by said window and engageable with said blade holder to move the latter from its first position towards its second position when said window approaches its fully closed position, said second spring means turning said first cam means towards its first position when said blade holder has been moved to its second position by said second cam means, said blade holder having a longitudinally extending opening therein beneath said wiper blade and a plurality of longitudinally spaced apertures in communication with said opening for directing pressurized washer fluid being delivered to said opening against said window.

* * * * *